UNITED STATES PATENT OFFICE.

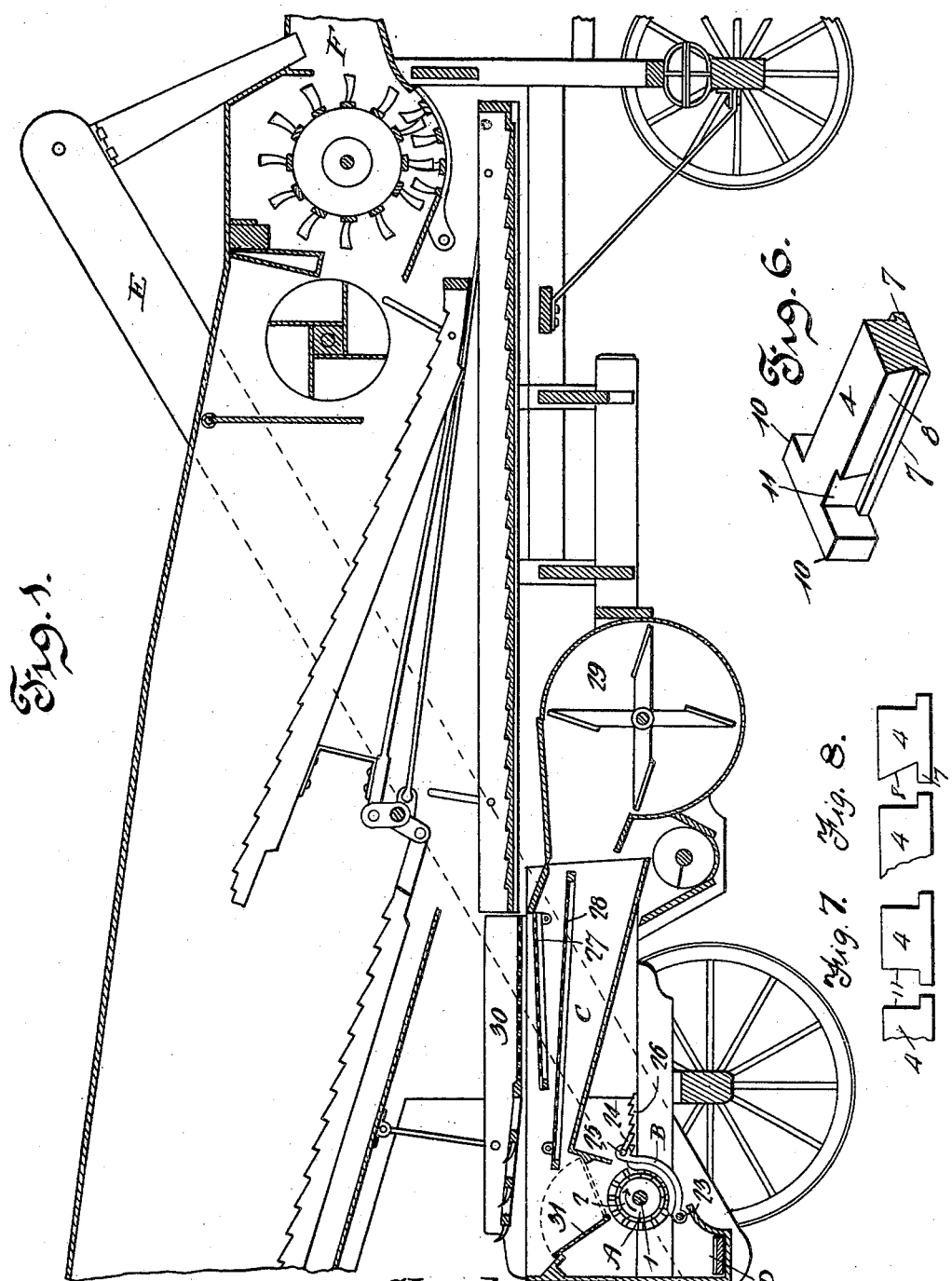

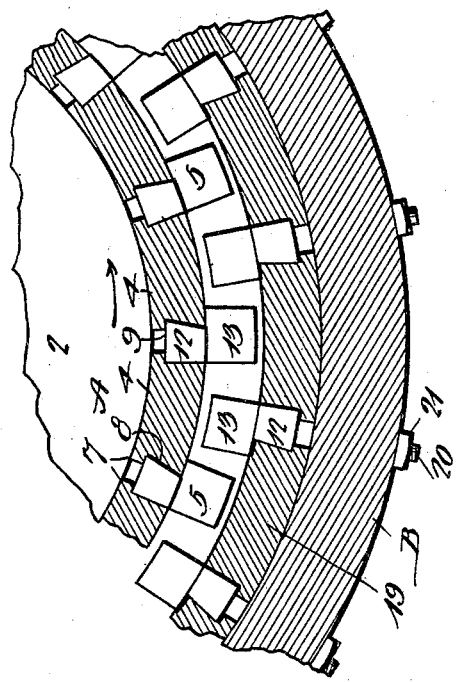
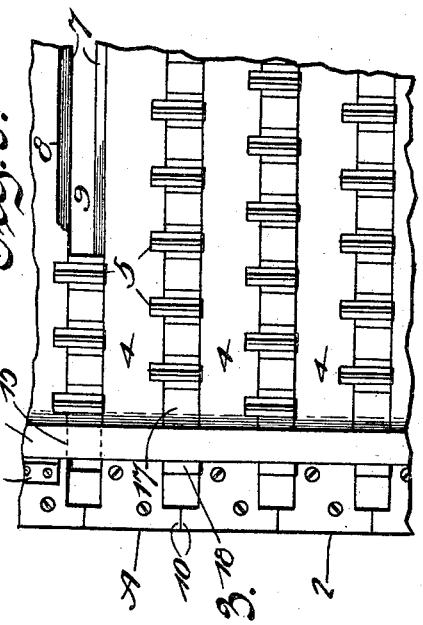
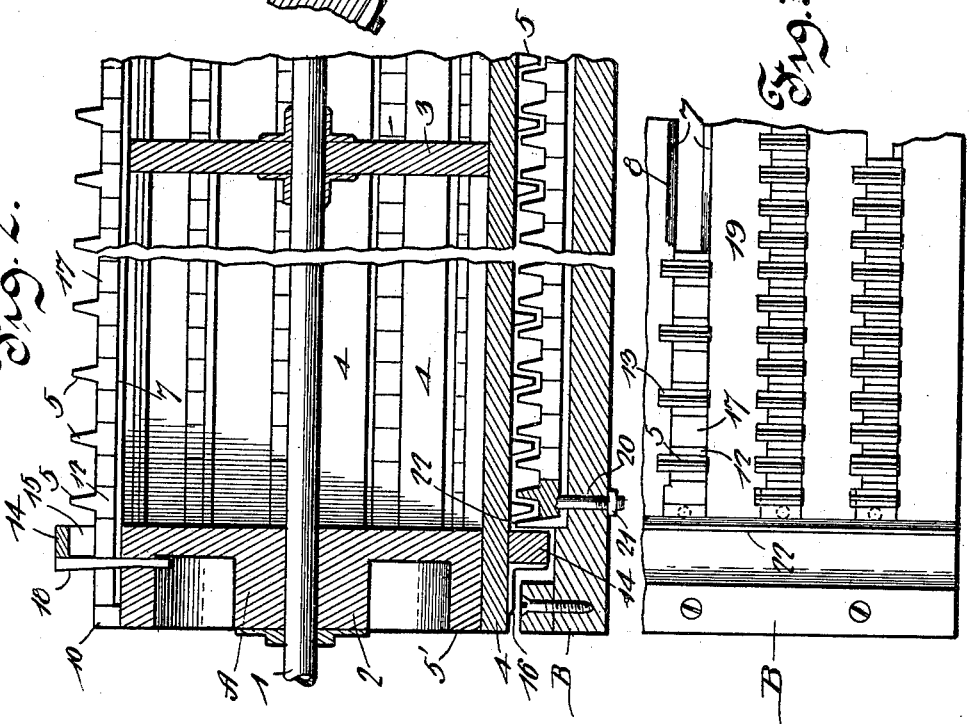
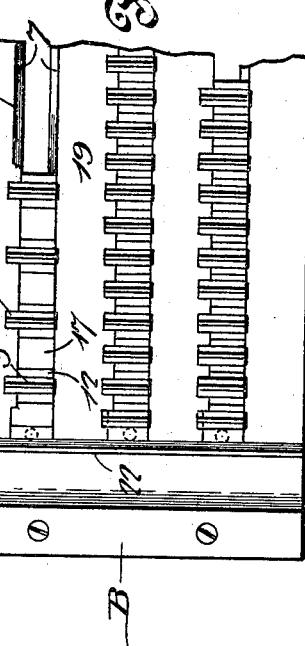

CHARLES SAYLOR, OF CODY, WYOMING.

CLOVER-HULLING ATTACHMENT FOR GRAIN THRESHERS AND SEPARATORS.

SPECIFICATION forming part of Letters Patent No. 696,498, dated April 1, 1902.

Application filed January 23, 1901. Serial No. 44,436. (No model.)

*To all whom it may concern:*

Be it known that I, CHARLES SAYLOR, a citizen of the United States, residing at Cody, in the county of Bighorn and State of Wyoming, have invented a new and useful Clover-Hulling Attachment for Grain Threshers and Separators, of which the following is a specification.

My invention is an improved clover-hulling attachment for threshing-machines and grain-separators by means of which an ordinary threshing-machine and grain-separator may be also used for the purpose of hulling clover and alfalfa.

My invention consists in the peculiar construction and combination of devices hereinafter fully set forth and claimed.

In the accompanying drawings, Figure 1 is a vertical longitudinal sectional view of a threshing-machine and grain-separator provided with my improved hulling attachment. Fig. 2 is a detail longitudinal sectional view of the cylinder and concave comprising my improved hulling attachment. Fig. 3 is a detail plan view of a concave, showing the arrangement of the teeth thereon. Fig. 4 is a detail transverse sectional view of a portion of the cylinder and concave. Fig. 5 is a detail plan view of the cylinder, showing the arrangement of the teeth thereon. Fig. 6 is a detail perspective view of a portion of one of the cylinder-bars. Fig. 7 is a detail transverse section taken through a pair of the longitudinal bars of the hulling-cylinder, showing the dovetailed groove formed between the opposing sides of said bars. Fig. 8 is a similar view showing the parallel-sided rabbet communicating with one end of said dovetail groove.

My improved clover and alfalfa hulling attachment comprises a cylinder A and concave B, arranged in operative position with relation to each other and disposed in a grain threshing and separating machine at a point in rear of the grain-shoe C and immediately in advance of and above the tailings trough or conveyer D, which, as is usual in this class of machines, conducts to an elevator, (indicated at E,) which reconveys the tailings to the threshing mechanism, (indicated at F.)

My improved hulling-cylinder comprises a shaft 1, heads 2, intermediate disks 3, and bars 4, which latter carry the teeth 5. The shaft 1 is journaled in suitable bearings in the frame of the grain threshing and separating machine and is driven by a suitable pulley and belt, which are not here shown, as the same are well understood by those skilled in machines of this class. The heads 2 are provided with flanges 5', on which bear the ends of the bars 4. The said bars extend from one head to the other and bear at intermediate points on the disks 3. The said bars 4 are suitably spaced apart and provided on their sides, at their inner corners, with flanges 7. One side of each bar 4 is inclined, as at 8, and between each pair of bars 4 is thus formed a dovetailed groove, as at 9, Fig. 4. The ends of the bars 4 are provided with shoulders 10, which extend in opposite directions. The said shoulders of each proximate pair of bars 4 are in contact with each other. Each pair of bars 10 are provided in their opposing sides at one end with a parallel-sided recess 11, which communicates with one end of the dovetailed groove formed between the said bars, and thereby adapts the dovetailed shanks 12 of the teeth 5 to be placed in said grooves, as will be understood. Each head 2 of the cylinder is provided with a detachable circular rim 14. The said rims have openings 15, through which the teeth pass as the same are placed in the grooves formed between the bars 4. The said rims 14 are disposed just within the rabbets 11 of said bars 4, and the said rims are secured to the said bars by any suitable means. I have here shown angle-irons 16, which are bolted to said rims and to said bars 4; but any other suitable means may be employed in lieu of the angle-irons; but I do not limit myself in this particular. The teeth 5 are suitably spaced apart by dovetailed space-blocks 17, and the said teeth and space-blocks are secured against longitudinal movement in the grooves formed between the bars 4 by keys 18, which form wedges, as shown in Fig. 2. The length of the hulling-cylinder is practically equal to the width of the space between the sides of the main casing of the threshing-machine and grain-separator.

The concave B is provided with a series of bars 19, which are identical in construction with the bars 4 of the hulling-cylinder, dovetailed grooves being thus formed between the said bars 19, and the concave-teeth and space-blocks are identical in construction with those of the cylinder, and hence the teeth and space-blocks may be used either on the hulling-cylinder or on the hulling-concave, as may be desired. The hulling-concave is placed in front of the hulling-cylinder and proximate thereto, as shown in Fig. 1. The lower rows of teeth of the hulling-concave are disposed closely together, the space-blocks being omitted, and hence the spaces between the intercurrent hulling-cylinder and concave-teeth are practically closed, being only slightly in excess of the diameter of alfalfa or clover seed to prevent material from being discharged from the coacting hulling cylinder and concave without being hulled. The opposing sides of the intercurrent cylinder and concave-teeth are beveled, as shown in Fig. 2. The end teeth in the dovetailed grooves formed between the bars of the concave are provided with bolt-shanks 20, on which are screwed nuts 21, which secure the said end teeth in place and prevent the intermediate concave-teeth from being displaced, as will be understood. Formed with or secured to the bars of the hulling-concave, on the inner sides thereof, are annular flanges 22, which are disposed adjacent to the rims 14, which form annular flanges on the hulling-cylinder, said flanges 14 and 22 coacting to prevent material from escaping endwise from between the hulling cylinder and concave.

The hulling-concave is pivotally mounted at its lower side, as at 23, and is provided at its free upper side at its ends with adjusting-pawls 24, carried by a shaft 25, which pawls engage adjusting-racks 26, with which the frame of the machine is provided. Hence the said concave may be adjusted to narrow or widen the space between it and the hulling-cylinder, as may be required by the condition of the clover or alfalfa.

The grain-shoe carries a lip-sieve 27 and a cleaning-sieve 28, which is below the lip-sieve, the blast from the fan 29 passing between said lip-sieve and cleaning-sieve and also below the latter. It will be observed by reference to Fig. 1 of the drawings that the chaffing-riddle 30 discharges onto the lip-sieve and that the latter and cleaning-sieve discharge onto the hulling-cylinder. Above the hulling-cylinder is a valve 31, which when turned to the position indicated in full lines in Fig. 1 uncovers the hulling-cylinder and permits material to be discharged thereon from the grain-shoe. When, however, the said valve is turned forward to the position indicated in dotted lines in Fig. 1, the same covers the upper side of the hulling-cylinder and material discharged from the grain-shoe falls directly into the tailings trough or conveyer D.

When the machine is used for threshing and separating grain, the valve 31 is turned, so as to cover the hulling mechanism, and the same is ungeared, so that the hulling mechanism is inoperative. When the machine is employed for hulling clover or alfalfa, such of the material as is not threshed and hulled by the threshing mechanism F is by the grain-shoe and valve 31 (the latter being turned to the appropriate position shown in full lines in Fig. 1) fed to the coacting hulling-cylinder A and concave B, as hereinbefore described.

Having thus described my invention, I claim—

1. A hulling-cylinder comprising the heads, bars secured thereon, having their opposing sides rabbeted to form dovetail grooves between them, said bars being further provided on their opposing sides at one end with parallel-sided rabbets communicating with said grooves, teeth having dovetail shanks adapted to enter said grooves by way of said rabbets, and keys to secure said teeth against movement longitudinally of the said bars, said keys engaging openings in one of the heads, substantially as described.

2. In combination with a threshing-machine and grain-separator, a hulling attachment for clover and alfalfa, said hulling attachment comprising a cylinder and concave disposed in rear of the grain-shoe, and immediately in advance of the tailings-conveyer, and a hinged valve above said hulling-cylinder to cover and uncover said hulling attachment, said valve when opened from said hulling-cylinder being disposed in rear of and below the grain-shoe, and discharging onto said hulling-cylinder, for the purpose set forth, and serving when closed to cover said hulling-cylinder and deflect material from the grain-shoe onto said hulling-cylinder and into said tailings-conveyer, substantially as described.

3. A hulling-cylinder comprising the heads, bars secured thereon, having their opposing sides rabbeted to form dovetail grooves between them, said bars being further provided on their opposing sides at one end with parallel-sided rabbets communicating with said grooves, teeth having dovetail shanks in said grooves, rims on said cylinder, over said bars, and keys to secure said teeth in said grooves between said bars, said keys engaging openings in one of the heads and bearing against the outer side of one of said rims, substantially as described.

4. In a clover-huller, the combination of a toothed hulling-cylinder and a toothed concave on one side thereof, the teeth of said cylinder and concave being intercurrent, the lower rows of teeth on the concave being disposed more closely together than the upper rows of teeth thereof, substantially as described.

In testimony that I claim the foregoing as my own I have hereto affixed my signature in the presence of two witnesses.

CHARLES SAYLOR.

Witnesses:
GEO. S. RUSSELL,
JOHN BUCHANAN.